United States Patent
Nordin et al.

(10) Patent No.: US 8,931,740 B2
(45) Date of Patent: Jan. 13, 2015

(54) MULTIFUNCTIONAL DE-ICING/ANTI-ICING SYSTEM

(75) Inventors: Pontus Nordin, Linköping (SE); Göte Strindberg, Linköping (SE)

(73) Assignee: SAAB AB, Linköping (SE)

( * ) Notice: Subject to any disclaimer, the term of this patent is extended or adjusted under 35 U.S.C. 154(b) by 359 days.

(21) Appl. No.: 13/522,368

(22) PCT Filed: Jan. 14, 2010

(86) PCT No.: PCT/SE2010/050028
§ 371 (c)(1),
(2), (4) Date: Oct. 16, 2012

(87) PCT Pub. No.: WO2011/087412
PCT Pub. Date: Jul. 21, 2011

(65) Prior Publication Data
US 2013/0043342 A1    Feb. 21, 2013

(51) Int. Cl.
*B64D 15/12* (2006.01)
*H05B 3/14* (2006.01)
(Continued)

(52) U.S. Cl.
CPC *H05B 3/145* (2013.01); *B64C 3/20* (2013.01); *B64C 3/26* (2013.01); *B64D 15/12* (2013.01); *H05B 2214/04* (2013.01)
USPC .................................. 244/134 D; 244/134 R

(58) Field of Classification Search
CPC ........... B64D 2033/0233; B64D 15/12; B64D 15/20; B64D 15/22; F02C 7/047; B60L 1/02
USPC ........ 244/134 R, 134 A, 134 D, 134 E, 134 F
See application file for complete search history.

(56) References Cited

U.S. PATENT DOCUMENTS 5,351,918 A * 10/1994 Giamati et al. ........... 244/134 D
5,475,204 A   12/1995 Giamati et al.
(Continued)

FOREIGN PATENT DOCUMENTS

EP          1873060 A1    1/2008
WO    WO-2006085054 A1   8/2006

OTHER PUBLICATIONS

PCT/ISA/210—International Search Report—Sep. 30, 2010.
(Continued)

*Primary Examiner* — Benjamin P Lee
(74) *Attorney, Agent, or Firm* — Venable LLP; Eric J. Franklin

(57) ABSTRACT

A de-icing/anti-icing system including at least two conductive structures embedded in an article that includes an outer surface designed as an aerodynamic surface. At least one of the conductive structures is arranged adjacent the outer surface. A control unit adapted to control the energy supply to the conductive structures for generating heat to the outer surface. A first of the conductive structures includes a first conductive nano structure and a second of the conductive structures includes a second conductive nano structure. A conductive property of the first of the conductive structures differs from a conductive property of the second of the conductive structures. The first conductive nano structure serves as a heating conductor and the second conductive nano structure serves as a heating element. The first and second conductive nano structures are embedded in a common plane of a resin layer forming the outer surface.

8 Claims, 5 Drawing Sheets

(51) Int. Cl.
*B64C 3/20* (2006.01)
*B64C 3/26* (2006.01)

(56) References Cited

U.S. PATENT DOCUMENTS

| | | | | |
|---|---|---|---|---|
| 5,657,951 | A * | 8/1997 | Giamati | 244/134 D |
| 5,971,323 | A | 10/1999 | Rauch et al. | |
| 6,338,455 | B1 | 1/2002 | Rauch et al. | |
| 7,291,815 | B2 * | 11/2007 | Hubert et al. | 219/535 |
| 7,391,622 | B2 * | 6/2008 | Marshall et al. | 361/804 |
| 8,549,832 | B2 * | 10/2013 | Maheshwari | 60/39.093 |
| 8,662,452 | B2 * | 3/2014 | Hallander et al. | 244/134 D |
| 2003/0052230 | A1 | 3/2003 | Feher | |
| 2005/0184193 | A1 | 8/2005 | Bourjac et al. | |
| 2008/0029648 | A1 * | 2/2008 | Giamati | 244/134 D |
| 2008/0099617 | A1 * | 5/2008 | Gilmore et al. | 244/134 R |
| 2008/0166563 | A1 | 7/2008 | Brittingham et al. | |
| 2009/0140098 | A1 | 6/2009 | Lengsfeld et al. | |
| 2009/0294724 | A1 * | 12/2009 | Attar | 252/70 |
| 2010/0155538 | A1 * | 6/2010 | Calder et al. | 244/134 D |
| 2012/0292439 | A1 * | 11/2012 | Hallander et al. | 244/1 A |
| 2014/0070054 | A1 * | 3/2014 | Burton et al. | 244/134 D |

OTHER PUBLICATIONS

PCT/IPEA/409—International Preliminary Report on Patentability—Dec. 27, 2011.

* cited by examiner

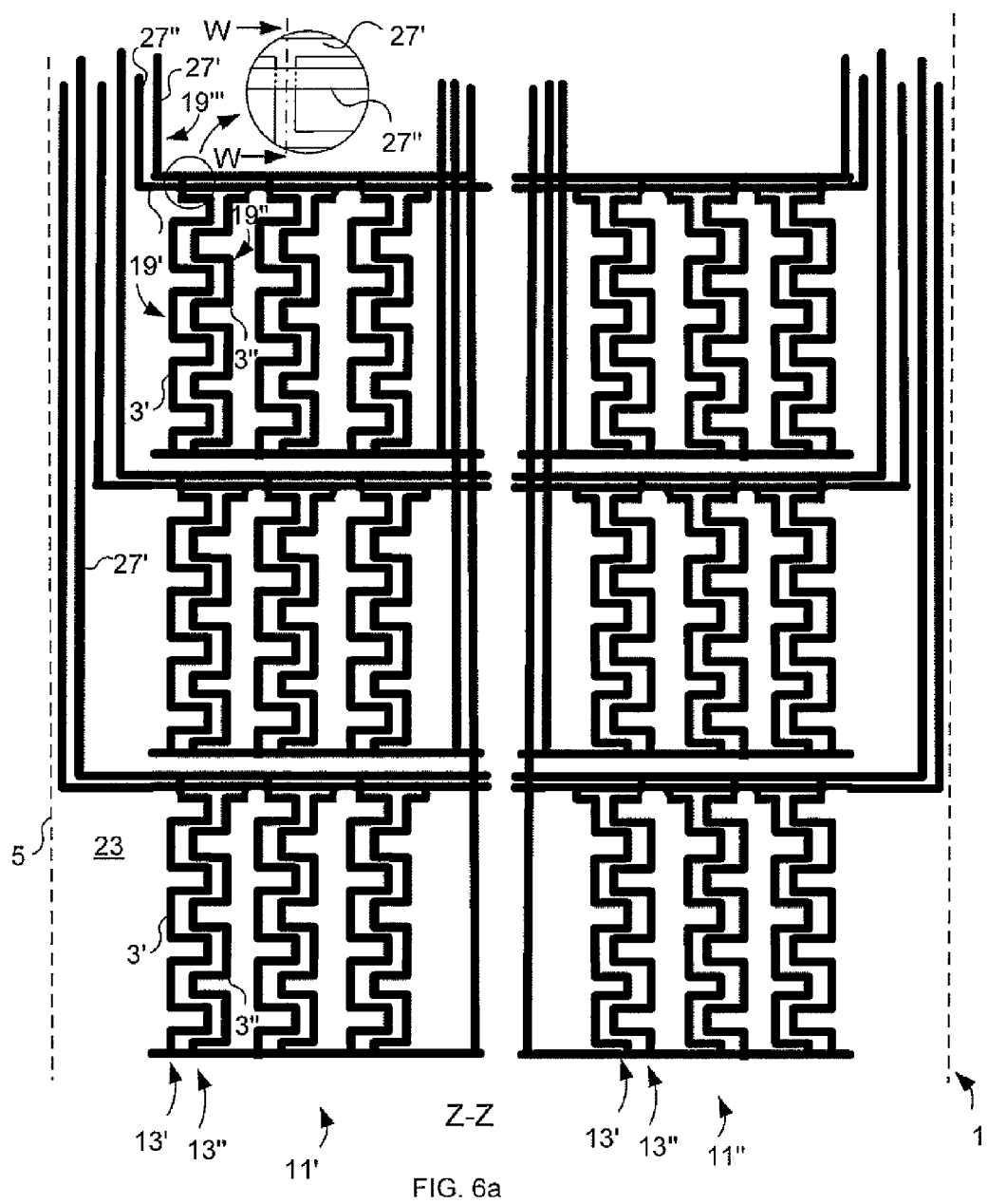
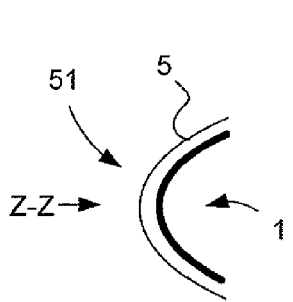
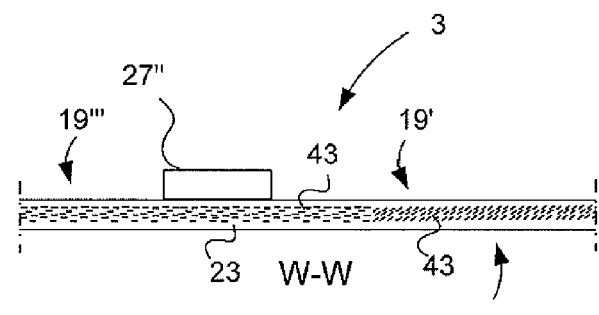
FIG. 6a
FIG. 6b
FIG. 6c

X-X

Y-Y

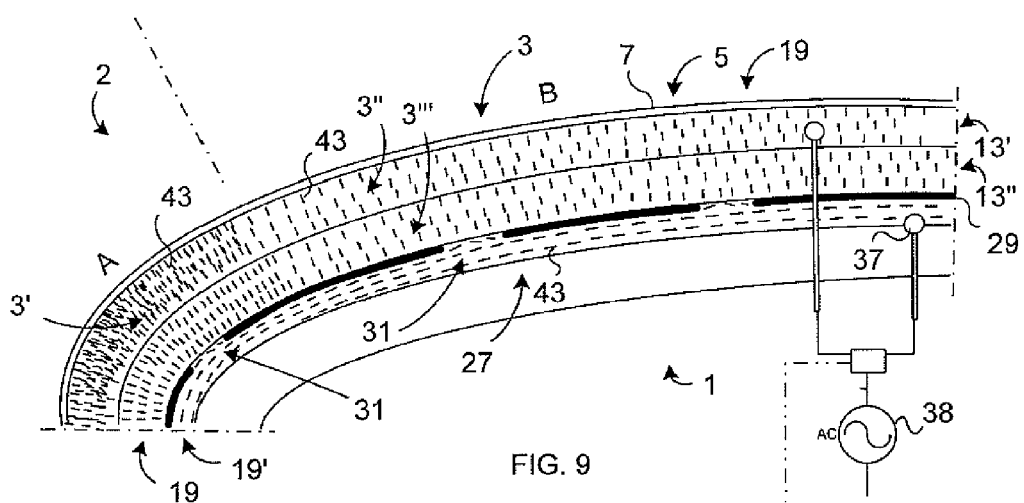
FIG. 9
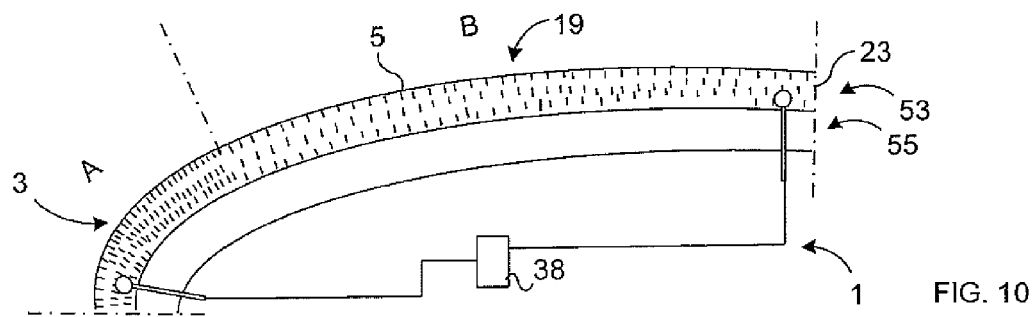
FIG. 10
FIG. 11
FIG. 12
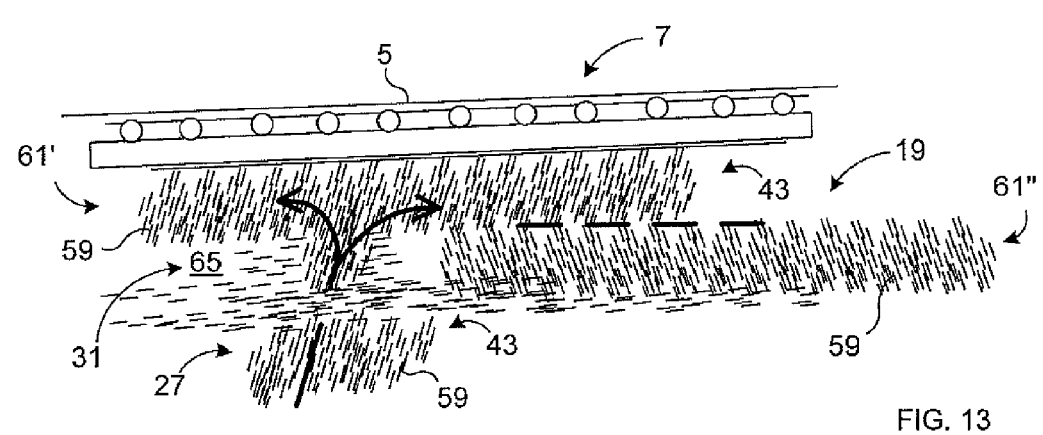
FIG. 13

MULTIFUNCTIONAL DE-ICING/ANTI-ICING SYSTEM

CROSS-REFERENCE TO RELATED APPLICATIONS

This application is the national phase under 35 U.S.C. §371 of PCT/SE2010/050028 filed 14 Jan. 2010.

TECHNICAL FIELD

The present invention relates to a multifunctional de-icing/anti-icing system and an article comprising an outer surface, which serves as an aerodynamic surface when the article moves relatively the air.

BACKGROUND ART

An article moving through the air may be subject for icing if specific weather conditions are present. Today aerodynamic surfaces of for example rotor blades of a rotorcraft, wings of an aircraft, blades of a rear-mounted "open rotor" engine (unducted fans), etc. are protected from icing by means of anti-icing and de-icing devices arranged at or beneath the aerodynamic surface. Icing is known as an undesired phenomenon, wherein a build-up of ice takes place on the aerodynamic surface. The aerodynamic surfaces could also be comprised in aero-engine air intakes, inlet channels etc.

Composite or metallic structures of the article comprising the aerodynamic surface are thus formed with aerodynamic functions and are subjected to ice build-up on their outer surfaces under specific operational conditions. The ice build-up has a strong negative effect on the aerodynamic efficiency of the affected article. For compensating the loss of aerodynamic function (e.g. sufficient lift, low drag, low efficiency etc.) due to eventual icing, the article (wing, turbine blade etc.) is often designed oversized. However, this implies a higher weight of the article itself, which of course is not desirable for aircrafts or other airborne platforms.

Anti-icing (preventing ice to form) and de-icing (melting of already formed ice) systems are therefore required in order to ensure and maintain the sufficient aerodynamic function of the affected aerodynamic surface of the article.

Currently used ice protection systems include the use of chemical liquids before aircraft take-off, pneumatic boots that brake off formed ice when inflated, heating of aerodynamic surfaces by use of engine bleed air, resistive heating of embedded electrical wires in the article and electro-mechanic devices that subject the affected structures to short duration vibration or single high energy pulses (chock waves).

The aerodynamic surface is herein defined as the outer (wet) surface of the article. The article's structure may comprise a resin matrix made of a laminate of plies, wherein each ply comprises fibres having an orientation different from—or identical to—the fibre orientation of an adjacent ply, wherein an outer ply of the laminate forms the outer surface. The article can also be defined as a component moving relatively the air, which can be a component mainly made of metal, such as a metallic structure, and covered by a composite layer.

EP 1 873 060 discloses a hybrid electrical ice protection system solving the problem of how to reduce the amount of thermal energy needed for anti-icing and de-icing the article's aerodynamic surface depending upon an event that the aircraft is in an off-nominal power condition. Thus, by means of a control unit, an anti-ice mode being selectively reduced from a fully anti-icing mode to a partly de-icing mode, in the event of off-nominal power condition. Heaters are formed as strips which can be disposed external to the outer surface.

There is thus a need to provide a de-icing/anti-icing system including an electrical heating system with improved reliability, having heaters with a high strength and low weight. There is also a need to provide a de-icing/anti-icing system that promotes for low energy consumption.

It is desirable to provide a de-icing/anti-icing system, wherein heaters of the system can be placed at positions in the article as near the aerodynamic surface as possibly and beneath it for concentrating the heat preventing ice to form thereupon or removing ice, still not affecting the aerodynamic function (smoothness) and the structure and/or strength of the article.

It is also desirable that the system has low power consumption and that it is reliable and fail-safe in service. A need for an environmental-friendly technique is also present for reducing or eliminating aircraft de-icing ground stations using sprayed-on chemical liquids.

It is also desirable to decrease an aircraft's fuel consumption, as this is environmental friendly.

It is also desirable to provide a de-icing/anti-icing system, which allows high use temperature.

It is also desirable to achieve a cost effective and flexible manufacture of the systems heaters.

There is also a need for an article comprising an aerodynamic surface, which article can be integrated in the de-icing/anti-icing system for providing an energy-saving anti-icing and de-icing functionality and which article at the same time is cost-effective to produce.

A further object is also to eliminate the eventual drawbacks of known techniques.

SUMMARY OF THE INVENTION

This has been achieved by the multifunctional de-icing/anti-icing system.

Thereby is provided a de-icing/anti-icing system, which allows high use temperature, due to the nano structure conductivity properties. The strength of the component will at the same time be increased by means of the predetermined orientation of the nano filaments (nano tubes/nano fibres etc. of the nano filament structure). By using the conductive nano structure as a heating element (increasing the electrical resistance for the current fed through the conductive structure by different arrangement of the filaments of the conductive nano structure) an effective de-icing/anti-icing system is provided.

The nano filament structure (comprising e.g. carbon nano tubes CNT, carbon nano fibres, graphite nano wires etc.) has a very good thermal and electrical conductivity and since the nano structure can be situated near and beneath the outer surface of the component, the energy losses for melting the ice will be low which means low power consumption. Thereby an energy saving system is achieved.

Suitably, the nano structure comprises carbon nano tubes (CNT). CNT's may be used because of their well defined conductive capacity resulting in low power consumption. They can also be arranged as continiuos layers or as patterns made of conductive (resistive) channels or surfaces with a suitable separation.

The CNT can be produced by emerging CNT technology resulting in grown forests of CNT for high efficiency. It is known that CNT can be grown in the shape of "forests" (mats of aligned CNTs) with vertical, tilted or horizontally arranged nanotubes. Combinations of these arrangements are also possible, e.g. as two or more separate layers stacked on top of each other. It is also possible to grow CNT's as well-defined patterns, suited for the intended application. The heating circuits, i.e. individually connected conductive nano structures, can be achieved during the CNT growth process. The term CNT in this application includes all types of carbon nanotubes. These can be single-wall, double-wall or multi-wall nanotubes. In addition, CNT-like materials like graphene, graphone and similar carbon-based materials with suitable electrical and thermal properties can be used. This includes single or multiple layers arranged in the plane of the anti-icing/de-icing layer or placed at a suitable angle to this plane. CNT and similar materials as described above have a very good thermal and electrical conductivity and are therefore very suited for the de-icing/anti-icing system. The design of an efficient system for de-icing/anti-icing functions, containing the conductive nano structure should be based on the fact that both the thermal and electrical conductivity of a bulk material, e.g. a polymer, using these fillers will vary with the filler content. The thermal conductivity of such a system can for instance increase or decrease with the CNT filler content, depending on specific conditions. The same is true for electrical conductivity.

The advantage of using carbon nano tubes (or suitable conductive nano structure) is the lower power needed for this material. The advantage is also that a cost effective production of the component is provided by the only need to different concentrations of the carbon nano tubes in the layer, and in different sections of the layer, for achieving different degrees of heat, depending on the needed mode of the ice protection system (i.e. where and to what degree heat should be applied to the outer surface for preventing/removing ice formations on the outer surface). This also means that it will be possible to minimize the total power consumption by optimizing the use of individual heating sections, i.e. in the same area (over each other or has interleaved circuits in the same area) or in selected areas of the component.

Preferably, the nano filament (CNT, nano fibre, nano multi wall filament, nano double wall filament, nano wire etc.) has a length of 0.125 mm or less. This is suitable for a common pre-preg ply having a thickness of 0.125 mm used in the production of aircrafts. If leaning, or in the plane oriented nano filaments are used, the length preferably can be longer. The definition of nano means that a filament particle has at least one dimension not more than 200 nm. 1 nm (nanometer) is defined as $10^{-9}$ meter (0,000 000 001 meter). Preferably, the diameter of a multiwall nano tube is 15-35 nm, suitably 18-22 nm. Suitably, the diameter of a single wall nano tube is 1.2-1.7 nm, preferably 1.35-1.45 nm.

The article is preferably made of a resin matrix, which comprises a laminate of plies. Each ply may comprise fibres (in the present application also can be called large fibres or traditional laminate reinforcing fibres) having an orientation different from—or identical with—the large fibre orientation of an adjacent ply (the diameter of the large fibre is approximately 6-8 micro meters).

The first and second conductive structures are suitably compatible regarding the thermal elongation with both glass fibre reinforced plastics (GFRP) and carbon fibre reinforced plastic (CFRP) structures. A common conductive structure for ice protection is today made of metal, which is less compatible with GFRP and CFRP due to a higher thermal expansion which may cause debonding, failure in the electrical path etc.

The de-icing/anti-icing system will be more robust than known integrated de-icing/anti-icing system due to the strength of the nano structure. Also is achieved a fail-safe function due to the high number of nano filaments and a low weight due to high efficiency and low specific density of carbon nano tubes when used as resistive heating elements and mechanical reinforcement. Heat resistant carbon nano tubes allow a higher use temperature than most existing systems.

Eventual cure shrinkage of the resin in different plies during manufacture of the component due to eventual uneven distribution of resin and different thermal elongation in the plies during the manufacture of an airframe structure comprising the article, will thereby not affect the smoothness of the outer surface by means of the reinforcing conductive nano structure arranged in the outer surface. By including the de-icing/anti-icing system in the airframe structure, an article for such system is achieved which is simple to produce and resistant to cracks in the outer surface and which is resistant to erosion during its use.

Alternatively, at least one of the conductive nano structures is embedded in a resin layer to such extent that at least a part of the conductive nano structure is exposed at the outer surface. In such way a very smooth and hard outer surface is provided having close geometrical tolerances. In such way is achieved that the outer surface of the article will be damage tolerant and hard.

The nano structure per se may thus extend to the outer surface, at the same time as it serves as a heating element. Thereby the outer surface (wet surface) of the article can be smooth (no exterior heaters) and hard. The achieved hardness promotes for a long-life smoothness of the aerodynamic surface, which reduces the fuel consumption of the aircraft due to the thereby actual laminar airflow over the aerodynamic surface.

Preferably, the energy supply is based on using DC power supply commonly used in current aircraft applications.

Alternatively, the energy supply is based on using AC power supply.

Suitably, the first conductive nano structure serves as a heating conductor and the second conductive nano structure serves as a heating element.

The conductive structure can thus comprise a conductive nano structure, which transfers thermal energy directly to the ice, and a conductive nano structure which transfers heat to the second conductive nano structure. This can be achieved by arranging the conductive filaments (nano tubes, nano fibres, nano wires etc) such that, within the area of the second conductive nano structure, the filaments have a closer distance between each other (than between the conductive filaments in the first conductive nano structure) to such degree that the resistance increases, but not to such degree that the conductivity ceases. The conductive filaments of the first conductive nano structure are preferably oriented parallel with the outer surface and essentially in the desired current conducting direction, wherein the first conductive nano structure works more as a heating conductor than a heating element. The conductive filaments of the second conductive nano structure are preferably oriented more transverse relative the outer surface than the conductive filaments of the first conductive nano structure, thus concentrating the heat to the outer surface.

The extension of the conductive nano structure's filaments (prolongation of nano tubes, nano fibres, nano wires etc) is preferably arranged in a layer in such way that the thermal energy will be streamed in the desired direction, i.e. the extension of the conductive filaments corresponds with the direction of the flow of thermal energy. In such way the thermal energy can be addressed to different areas of the outer surface—depending on which area at the moment being desired to heat—by different paths, each having a specific nano structure filament prolongation.

The de-icing/anti-icing system promotes both for a low weight of heating conductors (due to low density of CNT's) and large area applications (due to the achieved lower power consumption and improved efficiency), wherein the total area of the outer surface being protected from ice can be larger than with prior art de-icing/anti-icing systems.

Thereby is provided an extremely cost-effective assembly of the de-icing/anti-icing system and the article having the integrated de-icing/anti-icing functionality, wherein the conductive structures (heating elements and heating conductors) are made of the similar material (i.e. the conductive nano structure filaments).

Preferably, the first and second conductive nano structures are embedded in a common plane of a resin layer forming the outer surface.

In such way is achieved that the two conductive nano structures can co-operate for an anti-icing functionality in a first mode. Alternatively, only one of the conductive nano structures can be activated, so that less heat is generated for a de-icing functionality in a second mode.

Thereby is also achieved that the de-icing/anti-icing system's conductive structures promotes for a thin shell which is beneficial, i.e. for saving weight.

An article made of a polymeric composite matrix can thereby integrate the conductive structures. The article's shell comprising the resin layer including the conductive nano structures will therefore be reinforced, since the conductive nano structures per se also promote for a strengthening of the shell, which also may reduce the article's weight.

Alternatively, the resin layer comprises engineered patterns of nano structure in a suitable electrically insulating material, e.g. Kapton (trade name) and others. Also electrically conductive matrix materials are suitable as well, depending upon the functionality of the system.

Suitably, the first conductive nano structure of a first resin layer is arranged at least in a section isolated from and facing the second conductive nano structure of a second resin layer.

Thereby the first conductive nano structure can generate heat in an effective way, with no thermal losses transferred to the face to face arranged second resin layer not being activated in a specific low energy mode. The insulating layer can preferably be made of a suitably electrically insulating material, e.g. a polymer such as Kapton (trade name) or a glass material etc.

For example, the second nano structure can comprise CNT grown forest in specific pattern on an insulating substrate, wherein the extension of the "CNT forest" is predetermined from a desired functionality. The insulating layer between the second nano structure resin layer and the first nano structure resin layer comprises openings, through which two conductive nano structures of a respective layer contact each other. In this way a building of heating circuits in the article is achieved. Preferably, the conductive nano filaments (within an area positioned at the substrate corresponding with the openings) of one conductive nano structure are grown longer within this area so that they can come into contact with the other conductive nano structure through the opening in the insulating layer. Thereby also compensation in material is achieved regarding the lack of insulating material of the insulating layer within the area of the opening.

Vertical, leaning, horizontal carbon nano tubes can be applied into the respective layer in such way that separation of their thermal conductivity can be used to improve the functionality of the de-icing/anti-icing system.

Alternatively, the separation can thus be made by leaning the nano tubes of one layer relative to prolongation of the nano tubes of the adjacent layer.

For example, a separated heating conductor,—arranged through the first resin layer for supplying heat to the second conductive nano structure—, can preferably be isolated by insulating carbon nano tubes of the separate conductor with e.g. boron nitride which insulates the individual nano tube in transversal direction. The separated heating conductor itself can comprise parallel oriented carbon nano tubes extending in the direction of the heating conductor.

Preferably, the outer surface is a lightning protection layer.

Thereby the de-icing/anti-icing system is protected from being damaged due to eventual lightening strikes. The lightning protection layer may be a bronze net embedded in a resin layer. It is electrically isolated from the conductive nano structures. The isolation is provided in such way that an eventual lightning strike would not affect the de-icing/anti-icing system. The isolation being at the same time provided with a thermal property, such that the conductive nano structure of the article (when the de-icing/anti-icing system is in a de-icing/anti-icing mode) is able to transfer thermal energy to the lightning protection layer and thus the outer surface.

Alternatively, the outer surface also is an erosion protection layer. Thereby the article also is protected from being damaged in its surface due to rain erosion, sand erosion, dust etc.

Preferably, the system's conductive nano structure is exposed in the outer surface for achieving an optimal laminar flow over the outer surface acting as an aerodynamic surface. The outer surface thereby serves as the aerodynamic surface, when the wing shell moves relatively the air or through the air.

Suitably, the at least two conductive structures, are comprised in one set of heating elements, each of which being individually controlled by the control unit.

In such way individual heating areas of multi-section de-icing/anti-icing can be used sequentially. This means that the total power consumption can be minimized by optimizing the use of individual heating areas which may be placed in the same area or in different areas of the outer surface.

Thereby the conducting nano structure (e.g. CNT) patterns needed for anti-icing and/or de-icing can be arranged in multiple circuits with independent or combined function, thus resulting in several redundant systems. Depending on the number of connected active (powered) CNT patterns, the same treated (heated) area of the outer surface can be used for both anti-icing and de-icing.

There is thus possibly to tailor the de-icing/anti-icing system by adding additional layers of thermally conductive or insulating functions in order to achieve specific functions of the system depending on the required performance of the system.

Alternatively, the system further includes ice detection devices arranged in the outer surface and coupled to the control unit, and the control unit is adapted to activate one or several sets of heating elements in correspondence with detection of formed ice.

In such way the use of conductive nano structures allows multi-pattern of conductive structures for improved reliability and intelligent design of both de-icing and anti-icing function in the same application. As an example, it would be possible to release and partly melt formed ice locally over one section of an aerodynamic surface (such as a leading edge), using a relatively low power input. This would result in ice run-back to aft sections of the aerodynamic surface where a local high-power de-icing or anti-icing function would take care of the ice/water mix from the leading sections of the aerodynamic surface. Thereby the system cost, aerodynamic surface area and weight are minimized.

Preferably, the control unit is adapted to activate the two conductive structures to an anti-icing mode, wherein one conductive structure also is a reserve heating element for the de-icing/anti-icing system.

Thereby a failure proof function is achieved. The energy supply is provided to supply a current via a separate conductor to the reserve heating element for adding heat to the outer surface layer.

Suitably, the article covers a metal structure.

Thereby already existing components, such as a wing comprising an aluminium shell or another component having an aerodynamic surface made of a structure including other metal materials, can be provided with the de-icing/anti-icing system. Several conductive nano structure prepared resin layers (with or without structural matrix fibres), matching each other in respect to functionality are preferably adhered to e.g. the aluminium shell of the wing.

Alternatively, the article may cover any suitable material. In such way a thin layer comprising the de-icing/anti-icing functionality is achieved, which can be applied on all types of engineering materials used for fixed wing and rotary wing aircraft applications.

An adhesive layer is preferably applied between the conductive structure and the metallic structure, possible with suitable sectioning of the conductive structure comprising the conductive nano structures.

Preferably, the article is a composite airframe structure.

Thus a composite structure is provided including the article comprising the aerodynamic surface having aerodynamic functions, such as an aircraft wing of composite matrix resin laminate. The article's structure thus may comprise a resin matrix made of a laminate of plies, wherein each ply comprises fibres having an orientation different from—or identical to—the fibre orientation of an adjacent ply, wherein an outer ply of the laminate forms the outer surface. The conductive structures can in this way be embedded in a wing shell of said resin composite. Thereby is achieved a cost effective and flexible manufacture of the systems heaters integrated in the airframe structure of composite, such as an aircraft wing.

BRIEF DESCRIPTION OF THE DRAWINGS

The present invention will now be described by way of examples with references to the accompanying schematic drawings, of which:

FIGS. 6a-6c illustrate the functionality of two conductive structures comprised in one set of heating elements controlled by a control unit;

FIG. 9 illustrates a conductive structure also serving as a reserve heating element for the de-icing/anti-icing system;

FIG. 10 illustrates a de-icing/anti-icing system having a de-icing/anti-icing system integrated in a thin film covering a metal structure;

FIG. 11 illustrates a heating conductor of the de-icing/anti-icing system comprising conductive carbon nano fibres;

FIG. 12 illustrates an arrangement of conductive carbon nano tubes in the de-icing/anti-icing system for conducting heat; and FIG. 13 illustrates an example of conductive nano structures.

DETAILED DESCRIPTION

Hereinafter, embodiments of the present invention will be described in detail with reference to the accompanying drawings, wherein for the sake of clarity and understanding of the invention some details of no importance are deleted from the drawings. Also, the illustrative drawings show nano structures of different types, being illustrated extremely exaggerated and schematically for the understanding of the invention. The conductive nano structures are illustrated exaggerated in the figures also for the sake of understanding of the orientation and the alignment of the conductive nano filaments.

Figure 1:
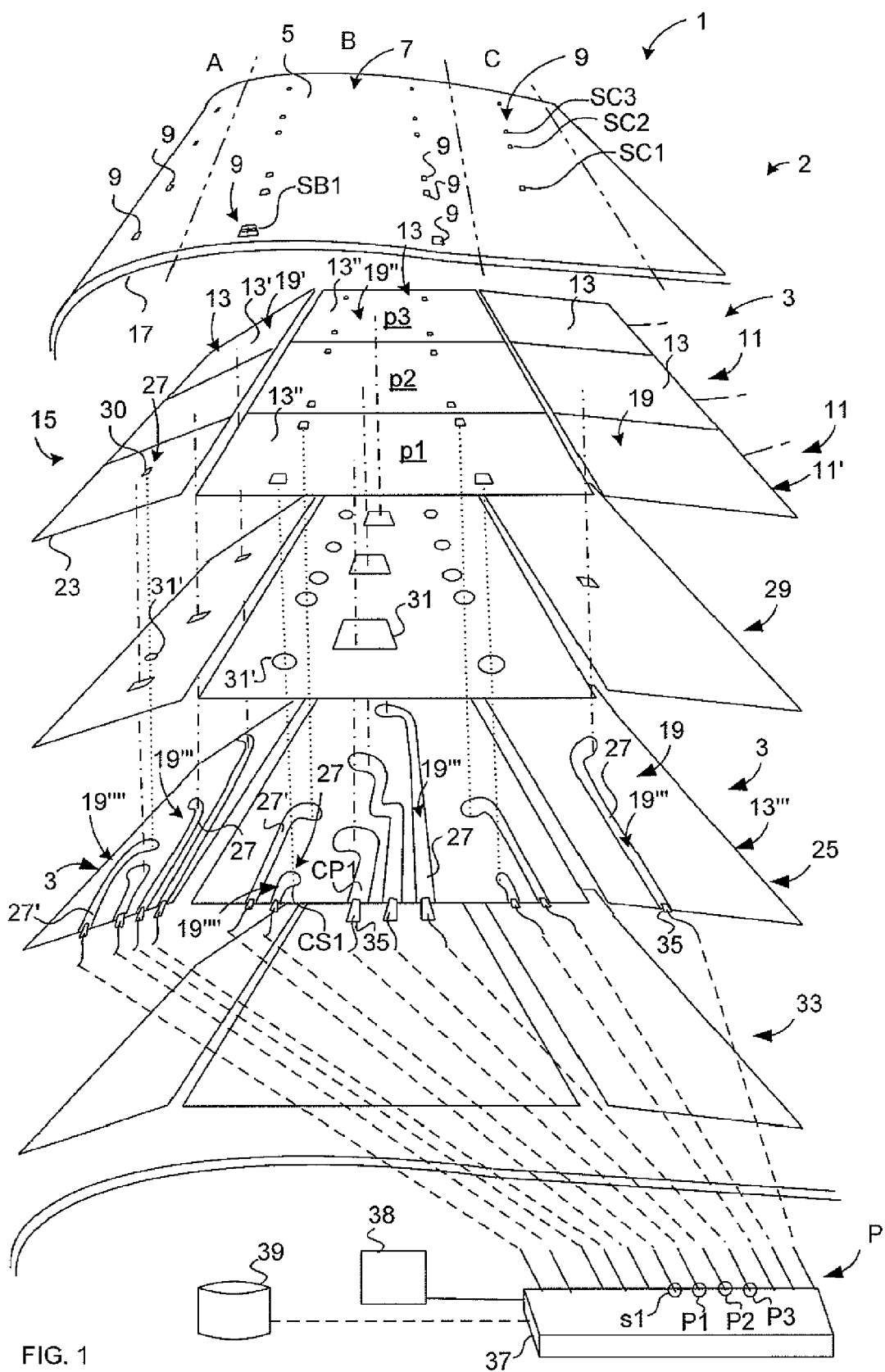
FIG. 1 illustrates a de-icing/anti-icing system according to a first embodiment.

FIG. 1 schematically illustrates a de-icing/anti-icing system (system 1) according to a first embodiment. The illustration shows parts of the embodiment essential for understanding only. The system 1 comprises an article 2 of a plurality of conductive structures 3 embedded in a wing shell. The wing shell includes an outer surface 5 being designed as an aerodynamic surface. The outer surface 5 thus serves as the aerodynamic surface, when the wing shell moves relatively the air or through the air. The outer surface 5 is a hard smooth surface of a lightning protection layer 7. The smoothness and hardness of the outer surface 5 are achieved by incorporating nano structure filaments at least into the outer surface, which nano structure also is conductive and acts for shielding the aircraft's interior from an eventual lightning strike. The outer surface 5 further comprises sensors 9 for detection of ice. Several sets 11 of conductive structures 3 (heating elements 13 in a heater layer 15) are arranged adjacent beneath and isolated from the lightning protection layer 7 by an insulating layer 17. The conductive structures 3 are thus, for the heater layer 15, arranged to serve as heating elements and comprise conductive nano structures 19 (see FIG. 1) in the form of carbon nano tubes (CNT's) 21 having different orientations and concentrations in a resin layer 23. One heating element 13' comprises a first conductive nano structure 19' (being explained further below).

Another heating element 13" comprises a second conductive nano structure 19". The heating element's 13', 13" conductive properties differ from each other (by arranging the nano structure filaments in certain directions and concentrations) so that different amount of heat will be transferred to the outer surface 5 in different positions. The position of each heating element 13 is elected from the knowledge where it is desirable to protect the wing shell from building of ice. Further conductive structures 13''' comprising a further design of conductive nano structures 19''' are embedded in a resin layer (heating conductor layer 25) beneath the sets 11 of conductive structures 13', 13" (heater layer 15). The conductive nano structures 19''' of the heating conductor layer 25 serve as heating conductors 27 conducting heat to the sets 11 of conductive structures. An isolator layer 29 is sandwiched between the sets 11 of conductive structures and the heating conductor layer 25. The isolator layer 29 is made of a suitably electrically insulating material, e.g. a polymer such as Kapton (trade name) or a glass material etc. In proper positions are openings 31 provided in the insulating material for making contact between the conductive nano structures 19''' of the heating conductor layer 25 and the sets 11 of conductive structures (heating elements). The heating conductors 27 are achieved by CNT grown forest on an insulating substrate, wherein the extension of the "CNT forest" is predetermined from the desired functionality. Conductors 27' made of bronze are also provided in the conductor layer 25 for contact with the sensors 9. Openings 31' in the isolator layer 29 are provided for this contact via partly isolated contact bronze plates 30.

The wing shell is assembled in one working step. The lightning protection layer 7, the heater layer 15, the isolator layer 29 comprising the openings 31, 31', the heating conductor layer 25 and a further insulating layer 33 are laid up, formed and cured into a finished article, here the wing shell. The layers are delivered to the aircraft industry and are engineered with proper conductive nano structures for the purpose of achieving the de-icing/anti-icing functionalities of the system 1. The layers 7, 15, 25, 29, 33 are rolled up at rollers (not shown) after that the engineered heating pattern with conductive nano structures 19', 19'', 19''', 19'''' are produced in the layers. The extension and orientation of each layer's conductive nano structure 19', 19'', 19''', 19'''' for providing the different anti-icing/de-icing functions, are computed by a computer (not shown) and each layer will match each other when they are laid in a pre-determined position forming the system 1.

Titanium 8 (or other suitable material) plates 35 are partly embedded in the respective conductor's 27, 27' nano structure for connection via electrical wires to a respective connection point P. A bus 37 is adapted to be arranged in contact with the sensors 9 and heating elements 13 via the bronze conductors 27' and heating conductors 27. A control unit 39 is arranged to control energy supply to the conductive structures 3 (heating elements 13, conductors 27) via the bus 37 from a current supply 38 for generating heat to the outer surface 5. The energy supply 38 is based on using DC power supply commonly used in current aircraft applications. By orientating and proper disposal of the conductive nano structure in the heating element 13, electric resistance can be increased in the latter for pre-determined sections of the heating element 13. During the production of the article, the different properties of the conductive nano structure are embedded in the wing shell for achieving the system 1.

The de-icing/anti-icing system 1 will work as follows. Ice is detected by the sensor SB1 in area B for one of the sets 11 (i.e. set 11'). A signal is fed to the control unit 39 via the conductor CS1 and bus 37 connection point s1. The control unit 39 is set to activate the specific heating element p1, wherein current is fed from energy supply bus 37 connection point P1 via the heating conductor CP1 to the heating element p1 (heating element 13' of set 11'). Only the p1 heating element 13'' has to be activated in this example, which saves energy. The heating conductor CS1 has carbon nano tubes essentially oriented parallel with the extension of the conductor layer's 25 and in the direction for leading the heat. The heating element p1 has carbon nano tubes oriented transversely to the extension of the heater layer 15 and the carbon nano tubes are arranged so near each other that the electric resistance increases for generating heat. An example of use of the system 1 is following. An aircraft (not shown) standing still on ground over night has been affected by ice over the wing in area B. The system 1 detects the ice before run up and the system activates the p1, p2, p3 heating elements 13'' so that the wing is clear from ice. Also clear ice not visible for the pilot eye will thus be detected and removed before take-off by means of the system 1. Only the area B heating elements 13'' have to be activated, thus energy is saved.

During flight, the aircraft wing shell and the system 1 are adapted to detect risk for icing, wherein the area A heating elements 13' (in a condition with risk for build-up of ice) are activated. The conductive nano structure filaments in the area A heating elements 13' are so dense packed that the electric resistance is as high as possible, but not so dense that the conductive nano structure will become insulating. The area A heating elements 13' are thus acting as anti-icing elements. Less energy is needed for the area B heating elements 13'', since this part of the wing shell is heated to such extent that eventual ice becomes water and blows backward due to the air stream. The area B heating elements 13'' are thus acting as de-icing elements. Eventual ice formed in area C will be detected by the sensors SC1, SC2, SC3, i.e. ice formed of water kept by the turbulent air flow over the rear part of the wing shell. In such case the area C heating elements 13''' will be activated by the system 1. This intelligence of the system 1, in combination with the robustness of the system 1, the cost effective and simple production of the article 2 creates a system that also saves energy for the aircraft.

Figure 2:
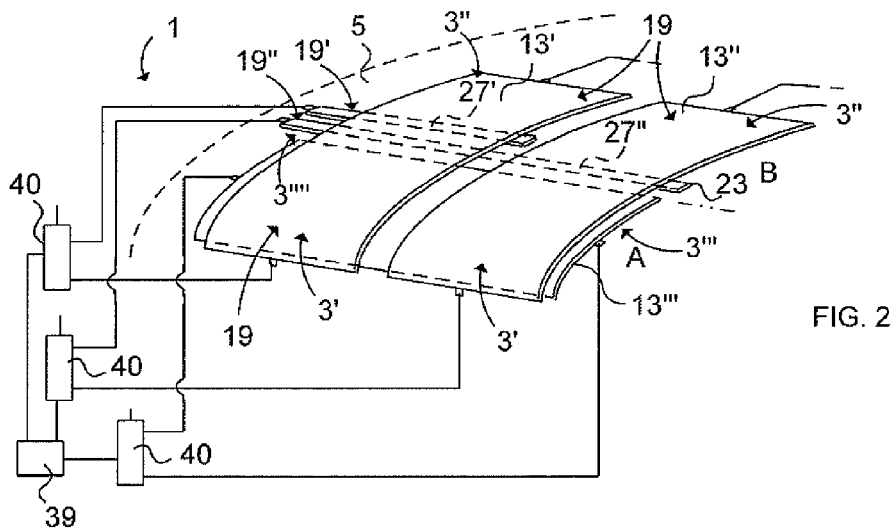
FIG. 2 illustrates a de-icing/anti-icing system according to a second embodiment.

FIG. 2 illustrates schematically a de-icing/anti-icing system 1 according to a second embodiment. In this case the system 1 comprises five conductive structures 3', 3'', 3''', 3'''', 3''''', each having a conductive nano structure 19, further explained below (see FIG. 3). A shorter heating conductor 27' of conductive nano structure 19' in an elongated resin layer extends to and is in contact with an upper inner heating element 13'. A longer heating conductor 27'' of conductive nano structure 19'' extends to an upper outer heating element 13''. Each of the heating element 13', 13'' is divided in two sections, each arranged for area A and area B respectively. This is made by arranging leaning conductive nano filaments (area B) and transversal (area A) conductive nano filaments (See also FIG. 3). A control unit 39 controls the current supply (on/off) to the respective heating element 13', 13'' via switches 40 and electrical wires. Due to the higher electric resistance of the area A conductive nano structure 19 an anti-icing function is provided for area A. Due to the lower electric resistance of the area B conductive nano structure 19, a de-icing function is provided for area B. A reserve heating element 13''' is arranged under the upper heating elements 13', 13''. In case of extreme icing conditions this extra layer of reserve heating element 13''' is activated for providing more heat to the area A (anti-icing zone). In case of failure function of the upper heating elements 13', 13'', the reserve heating element 13''' also is capable to generate heat through the conductive nano structures 19 of the shut down upper heating elements 13', 13''.

Figure 3:
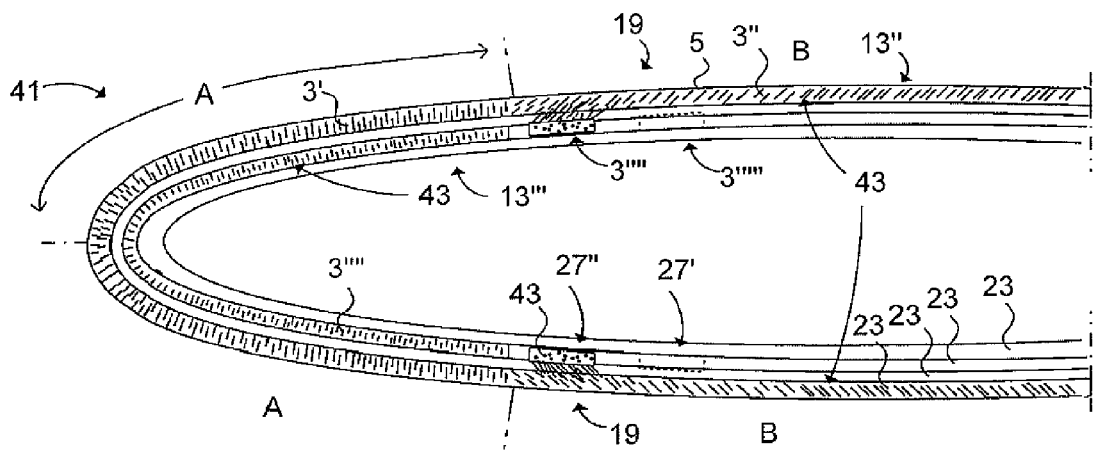
FIG. 3 illustrates a cross-section of an article using the system in FIG. 2.

FIG. 3 illustrates schematically a cross section of a stabilizer 41 comprising the system 1 shown in FIG. 2 on both sides of the stabilizer. Herein is shown that filaments 43 of the conductive nano structure 19 have various orientations. As shown, the shorter 27' and longer 27'' heating conductor have each conductive nano filaments, in this case carbon nano tubes (CNT's), which have their essential extension in the heating conductor's 27', 27'' prolongation (conductive structures 3'''', 3'''''). The upper heating element 13'' has for area A transverse oriented CNT's (conductive structure 3') and for area B leaning CNT's (conductive structure 3''). The leaning CNT's will make a less electric resistance than the transverse CNT's and makes a suitable conductive structure for the de-icing function. Beneath the upper heating elements 13', 13'' is the reserve heating element 13''' arranged and shown in a cross sectional view. The reserve heating element 13''' also has transverse oriented CNT's (conductive structure 3'''), but more compact for increasing the resistance, thus increasing the heat.

Figure 4:
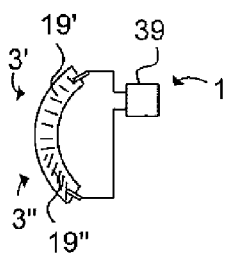
FIG. 4 illustrates a de-icing/anti-icing system according to a third embodiment.

FIG. 4 schematically illustrates a de-icing/anti-icing system 1 according to a third embodiment. The system 1 comprises a control unit 39 controlling the current supply via electrical wires to a de-icing/anti-icing heating element including one conductive structure 3' comprising a first conductive nano structure 19' and another conductive structure 3" including a second conductive nano structure 19". The two conductive structures 3', 3" have different functionality and different conductive properties due to the architecture of the conductive nano structure 19', 19" in respective conductive structure 3', 3". The control unit 39 controls the energy supply to the de-icing/anti-icing heating element by regulating the current level. By means of different electric resistance achieved by different orientations of the conductive nano structures 19', 19", heat of different temperature will be produced by each conductive structure 3', 3".

Figure 5:
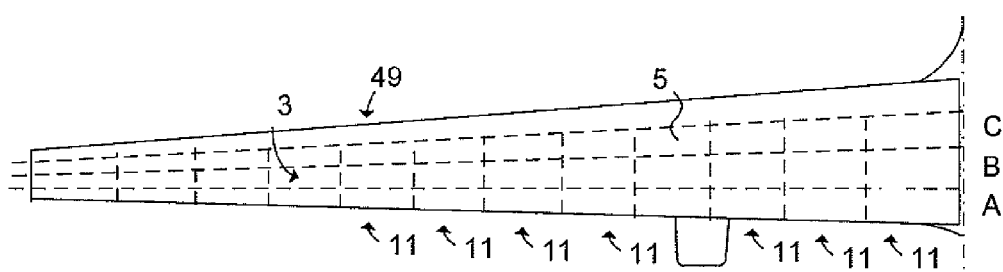
FIG. 5 illustrates an aircraft wing comprising the de-icing/anti-icing system.

FIG. 5 schematically illustrates an aircraft wing 49 comprising the de-icing/anti-icing system 1 shown in FIG. 1. The wing's 49 outer surface 5 covers several sets 11 (twelve sets) of de-icing/anti-icing heating elements, which sets 11 are individually controlled by the control unit (not shown) depending on the icing conditions and the speed of the aircraft through the air and the angle of incidence of the aircraft.

FIG. 6a schematically illustrates two conductive structures 3', 3" being comprised in one first set 11' of heating elements 13', 13". A first conductive nano structure 19' is included in one heating element 13' and connected to a first heating conductor 27'. A second conductive nano structure 19" is included in the other heating element 13" and connected to a second heating conductor 27". The system 1 further includes a further set 11" of heating elements 13', 13" assembled in the same way as the first one but separate connected via electrical wires to the current supply (not shown). View Z-Z in FIG. 6a shows in a front view a leading edge 51 of an open rotor blade and FIG. 6b illustrates schematically a cross-section of the same. An enlarged view W-W in FIG. 6c schematically shows the connection between the heating element 13' and the heating conductor 27'. The conductive nano structure 19''' is oriented essentially parallel with the desired heat transportation path of the first heating conductor 27' and a transition to the heating element 13' is performed by leaning of the nano filaments 43 into the first conductive nano structure 19'. The other heating element's 13" second heating conductor 27" is built according to the same principle. As each conductive nano structure 19', 19", 19''' is embedded in an insulating resin layer 23, the first and the second heating conductors 27', 27" cross each other without any extra insulating layer.

Figure 7A:
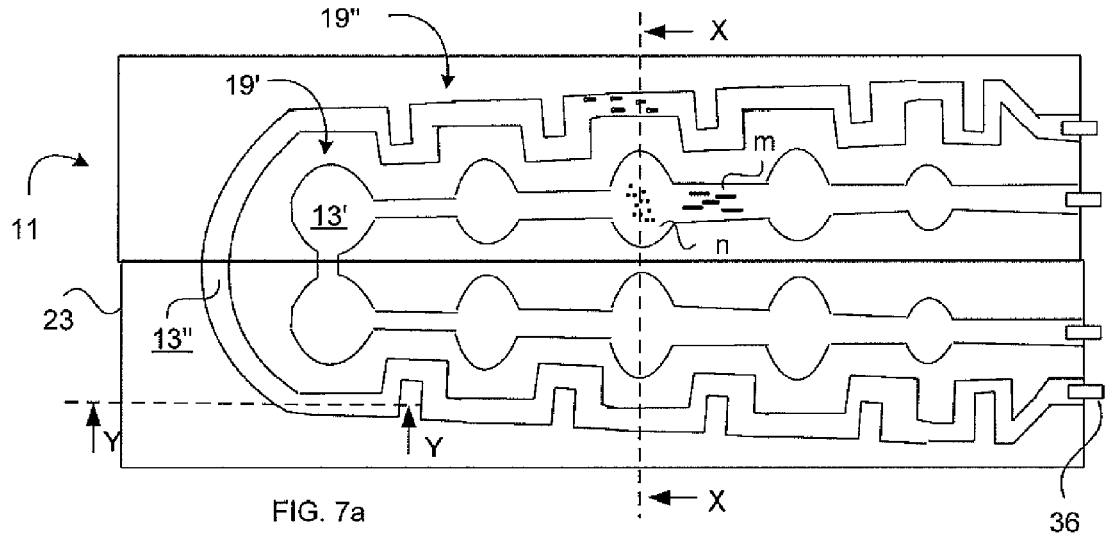
FIGS. 7a-7c illustrate a fourth embodiment wherein two conductive nano structures in one set are embedded in a common resin layer.
Figure 7B:
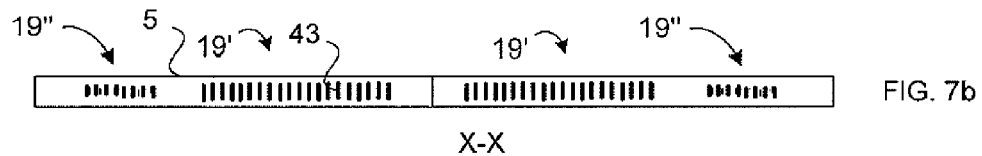
Figure 7C:
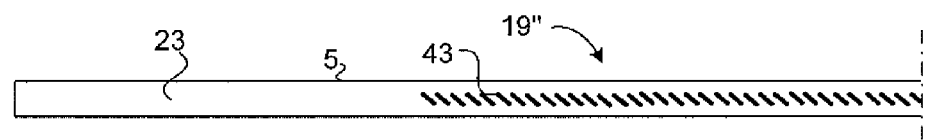

FIG. 7a schematically illustrates a fourth embodiment. Two conductive nano structures 19', 19" are arranged in one set 11 of heating elements 13', 13" and are embedded in a common resin layer 23. One (the inner 19') of the conductive nano structures comprises CNT's oriented in two directions, i.e. parallel with the layer (at position m) and transverse (at position n) to the layer. Bronze plates 36 are arranged in contact with the conductive nano structure 19', 19" for electrical connection to a current supply (not shown) via electrical wires. The outer conductive nano structure 19" comprises leaning CNT's 43 as is shown in FIG. 7c according with cross-section Y-Y. FIG. 7b shows schematically a cross-section X-X, wherein is illustrated the transverse oriented CNT's of the inner conductive nano structure 19' and the leaning CNT's of the outer conductive nano structure 19". The inner 19' and outer 19" conductive nano structures are embedded in the common resin layer 23 forming the outer surface 5.

Figure 8:
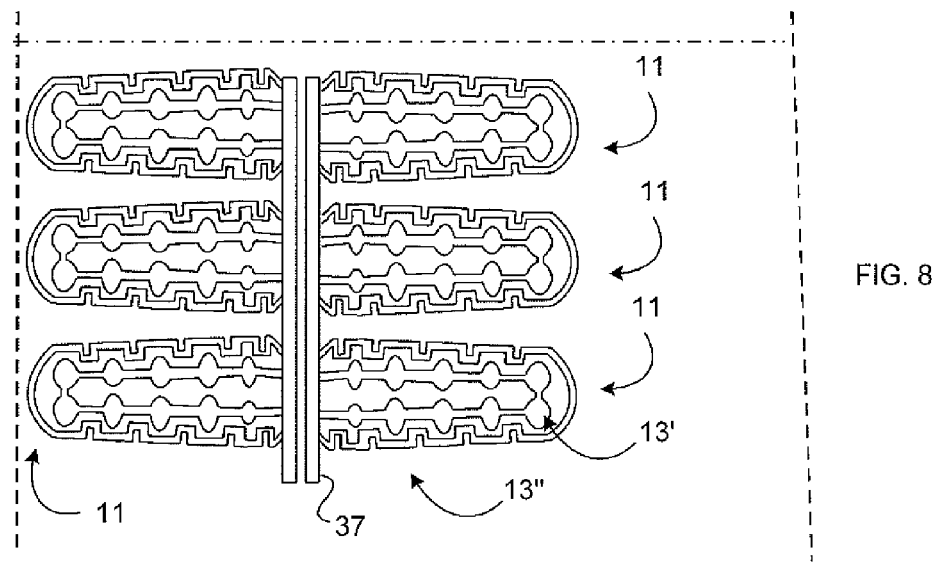
FIG. 8 illustrates the sets of heating elements in FIG. 7a individually controllable by a control unit.

FIG. 8 schematically illustrates six sets 11 of the heating elements 13', 13", one of which set 11 is shown in FIG. 7a. Each set 11 is individually controlled by a control unit (not shown), which activates a set 11 of heating elements if it detects (via sensors, not shown) ice formation at the outer surface within the area for that particular set 11. Each set 11 is connected to a common bus 37.

FIG. 9 schematically illustrates a conductive structure 3 also serving as a reserve heating element for the de-icing/anti-icing system 1. The article 2 comprises an outer surface 5 designed as a lightning protective layer 7. Beneath the lightning protective layer 7 is arranged a first heating element 13' comprising two conductive structures 3', 3" with different conductivity properties. The conductive properties are achieved by arranging the conductive nano structures 3', 3" with transverse orientation relative the outer surface 5 for concentration of heat generated by the electric resistance. De-icing zone B requires a wider distance between the nano filaments 43 (with less resistance of the conductive nano structure 3" thus generating less heat and requiring less energy) than anti-icing zone A. Beneath the first heating element 13' is a second heating element 13" arranged (serving as a reserve heating element). The conductive nano structure in the second heating element 13" is essentially the same as for the first heating element 13'. A current supply 38 based on AC power is switchable connected to the respective heating element 13', 13" via electrical wires. A heating conductor 27 in the form of aligned conductive nano structure filaments 43, also show in FIG. 9, thermally connects the bus connect point 37 of the current supply 38 with the second heating element 13" via transverse oriented carbon nano tubes 51' (see FIG. 12). The heating conductor 27 is partly thermally shielded from the second heating element 13" by means of transverse oriented CNT's 51 which form a nano structure shield for concentrating the heat to the proper area. Openings 31 in the formed shield permit the additional conductive (slightly longer) carbon nano tubes 51' to connect the heating conductor 27 with the second heating element 13". This extra prolongation of these CNT's 51' corresponds also with the thickness of the insulating layer 29 for selected areas. The conductive nano structures 19 constituting the second heating element 13" are thus arranged at least in a section isolated from and facing the conductive nano structure 19' of the heating conductor 27 also formed within a resin layer.

FIG. 10 schematically illustrates a de-icing/anti-icing system 1 having a de-icing/anti-icing conductive nano structure 19 integrated in a thin resin film 53 covering a metal structure 55. Otherwise the functionality is provided as the FIG. 4 embodiment. Thereby already existing components, such as a wing comprising an aluminium shell or another component having an aerodynamic surface made of a structure including metal materials, can be provided with the de-icing/anti-icing system 1. Several conductive nano structure 19 prepared resin layers 23 (with or without structural matrix fibres), matching each other in respect to functionality are adhered to the aluminium shell of the wing. The system's 1 conductive nano structure is exposed in the outer surface 5 for achieving an optimal laminar flow over the outer surface acting as an aerodynamic surface.

An adhesive layer (not shown) is preferably applied between the conductive structure 3 and the metallic structure 55, possible with suitable sectioning of the conductive structure 3 comprising the conductive nano structures 19.

FIG. 11 illustrates a heating conductor 27 of the de-icing/anti-icing system 1 comprising conductive carbon nano fibres 57. The conductive carbon nano fibres 57 being not as well defined as the CNT's in FIG. 12, but are suitable to use for e.g. a heating conductor 27 in the system's 1 resin layers for saving cost.

FIG. 12 schematically illustrates transverse oriented carbon nano tubes 51, 51' (CNT's). CNT's are very well defined and are relatively cost-effective to produce and thus suitable to use in the building of heating elements 13. They also serve as highly strengthening the article 2 at the same time as a low power consumption can be achieved. Thermal circuits of the system 1 are thus achieved during the CNT growth process in this example. The CNT material has a very good thermal conductivity and is therefore very suited for the system 1. The thermal conductivity of a bulk material (e.g. a polymer) using the CNT as filler material, will vary with the filler content. In this example, the thermal conductivity of the heating element can increase or decrease with the CNT filler content.

FIG. 13 illustrates an example of conductive nano structures 19 using conductive nano wires 59 as a part of the system. Grown "forests" with nano filaments 43 of individual heating layers 61', 61" are placed on top of each other. The lower layer 61" comprises an opening 31 filled with an insulating material 63. Through the insulating material 63 extends a heating conductor 27 comprising also conductive nano filaments 43 of the type nano wires 59. This conductor 27 connects the upper layer 61' with a heating source (not shown). The lower layer 61" has a different conductive property than the heating conductor 27.

A lightning protection layer 7, in the form of a bronze net embedded in electrical insulating resin, covers the heating layers 61', 61" and is electrically isolated from the heating layers. However, the resin has a thermal property which promotes for the transportation of heat from the heating layers 61', 61" to the outer surface 5 of the lightning protection layer 7, i.e. the aerodynamic surface. Thus is achieved a de-icing/anti-icing system 1 with multiplex functions and which is robust in all aspects.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. For example the number of heating layers within the system can be of any number. The CNT can be grown in the shape of "forests" (mats of aligned CNT's) with vertical, tilted or horizontally arranged CNT's. Combinations of these arrangements are also possible, e.g. as two or more separate layers stacked on top on each other. It is also possible to grow CNT's as well defined patterns, suited for the intended application. The term CNT in this application includes all types of carbon nano tubes suited for the system. The CNT can be single-wall, double-wall or multi-wall nano tubes. In addition, CNT-like materials like grapheme, graphone and similar carbon-based materials with suitable thermal properties can be used. This includes single or multiple layers arranged in the plane of the de-icing/anti-icing layer or placed at a suitable angle to this plane. The nano structure can also be defined as a nano filament structure including different types of nano filaments (nano tubes, nano wires, nano fibres etc.). The composite matrix of the article can be epoxy, polymides, bismaleimides, phenolics, cyanatester, PEEK, PPS, polyester, vinylester and other curable resins or mixtures thereof. If used, the fibre structure in the matrix may be of ceramic, carbon and metal or mixtures thereof.

The invention claimed is:

1. A de-icing/anti-icing system, comprising:
at least two conductive structures embedded in an article, which includes an outer surface being designed as an aerodynamic surface, wherein at least one of the conductive structures is arranged adjacent the outer surface, and
a control unit adapted to control the energy supply to the conductive structures for generating heat to the outer surface,
wherein a first of the conductive structures comprises a first conductive nano structure and a second of the conductive structures comprises a second conductive nano structure, wherein a conductive property of the first of the conductive structures differs from a conductive property of the second of the conductive structures, wherein the first conductive nano structure serves as a heating conductor and the second conductive nano structure serves as a heating element, and wherein the first and second conductive nano structures are embedded in a common plane of a resin layer forming the outer surface.

2. The system according to claim 1, wherein the first conductive nano structure of a first resin layer is arranged at least in a section isolated from and facing the second conductive nano structure of a second resin layer.

3. The system according to claim 1, wherein the outer surface is a lightning protection layer.

4. The system according to claim 1, wherein the at least two conductive structures, are comprised in one set of heating elements, each of which being individually controlled by the control unit.

5. The system according to claim 4, further comprising:
ice detection devices arranged in the outer surface and coupled to the control unit, and the control unit is adapted to activate at least one set of heating elements in correspondence with detection of formed ice.

6. The system according to claim 1, wherein the control unit is adapted to activate the two conductive structures to an anti-icing mode, wherein one conductive structure also is a reserve heating element for the de-icing/anti-icing system.

7. An article of the de-icing/anti-icing system according to claim 1, wherein the article covers a metal structure.

8. An article of the de-icing/anti-icing system according to claim 1, wherein the article is a composite airframe structure.

* * * * *